(12) United States Patent
Peyrisse et al.

(10) Patent No.: US 8,950,172 B2
(45) Date of Patent: Feb. 10, 2015

(54) THRUSTER COMPRISING A PLURALITY OF ROCKET MOTORS

(75) Inventors: Daniel Peyrisse, Saint Marcel (FR); Jean-Marie Conrardy, Courcelles sur Seine (FR)

(73) Assignee: Snecma, Paris (FR)

( * ) Notice: Subject to any disclaimer, the term of this patent is extended or adjusted under 35 U.S.C. 154(b) by 1029 days.

(21) Appl. No.: 13/003,371

(22) PCT Filed: Jul. 10, 2009

(86) PCT No.: PCT/FR2009/051389
§ 371 (c)(1),
(2), (4) Date: Apr. 5, 2011

(87) PCT Pub. No.: WO2010/004232
PCT Pub. Date: Jan. 14, 2010

(65) Prior Publication Data
US 2011/0173985 A1    Jul. 21, 2011

(30) Foreign Application Priority Data

Jul. 11, 2008  (FR) .................................... 08 54770

(51) Int. Cl.
*F02K 7/18*    (2006.01)
*F02K 9/97*    (2006.01)
*F02K 9/64*    (2006.01)
*F02K 9/60*    (2006.01)

(52) U.S. Cl.
CPC ... *F02K 9/60* (2013.01); *F02K 7/18* (2013.01); *F02K 9/64* (2013.01)

USPC ................... 60/224; 60/244; 60/767; 60/768

(58) Field of Classification Search
CPC ..................................... F02K 7/18; F02K 9/97
USPC ..................... 60/767, 224, 244, 768
See application file for complete search history.

(56) References Cited

U.S. PATENT DOCUMENTS

| 3,423,942 | A | * | 1/1969 | Spindler ....................... 60/207 |
| 5,363,645 | A |  | 11/1994 | Pellet |
| 5,438,834 | A |  | 8/1995 | Vuillamy et al. |
| 6,915,627 | B2 | * | 7/2005 | Calabro ......................... 60/258 |

(Continued)

FOREIGN PATENT DOCUMENTS

| DE | 1 025 681 | 3/1958 |
| EP | 0 571 254 | 11/1993 |

(Continued)

OTHER PUBLICATIONS

Daines R et al., "Combined Rocket and Airbreathing Propulsion Systems for Space-Launch Applications," Journal of Propulsion and Power, American Institute of Aeronautics and Astronautics, NY, vol. 14, No. 5, Sep. 1998, pp. 605-612.

(Continued)

*Primary Examiner* — Ehud Gartenberg
*Assistant Examiner* — Jason H Duger
(74) *Attorney, Agent, or Firm* — Preti Flaherty Beliveau & Pachios LLP

(57) ABSTRACT

The jet (40) has an air-fuel combustion chamber (42) and a plurality of rocket engines (11) arranged upstream from the combustion chamber (42), each rocket engine having its own combustion chamber with the wall thereof being cooled by lateral injection of fuel through said wall.

14 Claims, 2 Drawing Sheets

(56) References Cited

U.S. PATENT DOCUMENTS 6,981,364 B2 * 1/2006 Okamoto et al. ............... 60/224
2004/0128980 A1 7/2004 Calabro

FOREIGN PATENT DOCUMENTS

| | | |
|---|---|---|
| EP | 0 604 279 | 6/1994 |
| EP | 1 342 905 | 9/2003 |
| GB | 2 196 393 | 4/1988 |
| JP | 2004360679 | 12/2004 |

OTHER PUBLICATIONS

Scott, W.B., "Aeroject Tests Show Strutjet 'Ready to Fly'," Aviation Week and Space Technology, McGraw-Hill Company, NY, vol. 151, No. 1, Jul. 1999, pp. 57-60.

* cited by examiner

THRUSTER COMPRISING A PLURALITY OF ROCKET MOTORS

TECHNICAL FIELD

The invention relates in general to hypersonic propulsion, i.e. making use both of rocket type propulsion and of air-breathing propulsion of the ramjet or super-ramjet type. Propulsion in rocket mode serves to accelerate the vehicle to a supersonic speed that is sufficient to allow operation in ramjet mode. The invention relates more particularly to arranging a plurality of rocket engines of a particular type in a ramjet in order to obtain a ramjet that can be used for a very long duration, possibly being reusable.

BACKGROUND

It is known, e.g. from an article by W. B. Scott published in the journal "Aviation Week and Space Technology" of Jul. 5, 1999, to arrange a plurality of small rocket engines in a ramjet. However that article remains vague about the particular design of the small rocket engines.

A major problem is cooling the walls of the combustion chambers and the nozzles of those small rocket engines, given that the temperature reached by the combustion gas is greater than 3000 K. This makes the length of life of such systems quite problematic, particularly if is desired to produce a machine that is reusable.

BRIEF SUMMARY

The invention enables this problem to be solved by a particular choice in the type of rocket engine used.

More particularly, the invention provides a supersonic jet, characterized in that it comprises a ramjet comprising an air-fuel combustion chamber and a plurality of rocket engines arranged in the airstream upstream from said combustion chamber, and in that such a rocket engine fed with a mixture of propellant components comprises a tubular body provided internally with a coaxial wall forming a screen that defines an annular fuel injection zone extending over the major fraction of the length of said body, and an oxidizer injector opening out axially into the inside of said screen in the vicinity of the front end thereof.

The combustion chamber of the rocket engine is essentially constituted by the inside volume of said screen, and this type of fuel injection ensures that the screen is cooled.

This structure enables all of the fuel or fuel-rich gas to be injected laterally through the wall of said screen. This concept implements a cooling principle referred to as "sweating". This type of fuel injection enables the wall of the combustion chamber to be cooled simply by forming a protective film. It is thus possible to provide rocket engines of small diameter and to group them together to constitute narrow injector pylons. A "pylon" is constituted by a plurality of rocket engines grouped together side by side and extending parallel to one another in a single row. Such pylons may be arranged so as to constitute a grid installed in the airstream upstream from the combustion chamber of the ramjet. The grid presents relatively little obstruction to the airstream.

Thus, by way of example, the wall of the combustion chamber is cooled by creating, on demand, a film of hydrogen-rich gas that is injected laterally and that protects the wall of the combustion chamber. Until now, this type of cooling has been underestimated, since it has in principle the effect of reducing unit performance of a rocket engine of this type. However, in the context of installation in a ramjet, this loss is compensated downstream by the excess fuel (i.e. the hydrogen that was used for cooling) mixing with the air passing through the ramjet and engaging in post-combustion. Consequently, the invention provides overall performance that is at least equal to, or even better than, that of conventional rocket engines fed with a mixture of oxygen and hydrogen.

BRIEF DESCRIPTION OF DRAWINGS

The invention can be better understood and other advantages thereof appear more clearly in the light of the following description of a rocket engine and a supersonic jet fitted with a plurality of such rocket engines, given purely by way of example and made with reference to the accompanying drawings, in which.

DETAILED DESCRIPTION

Figure 1:
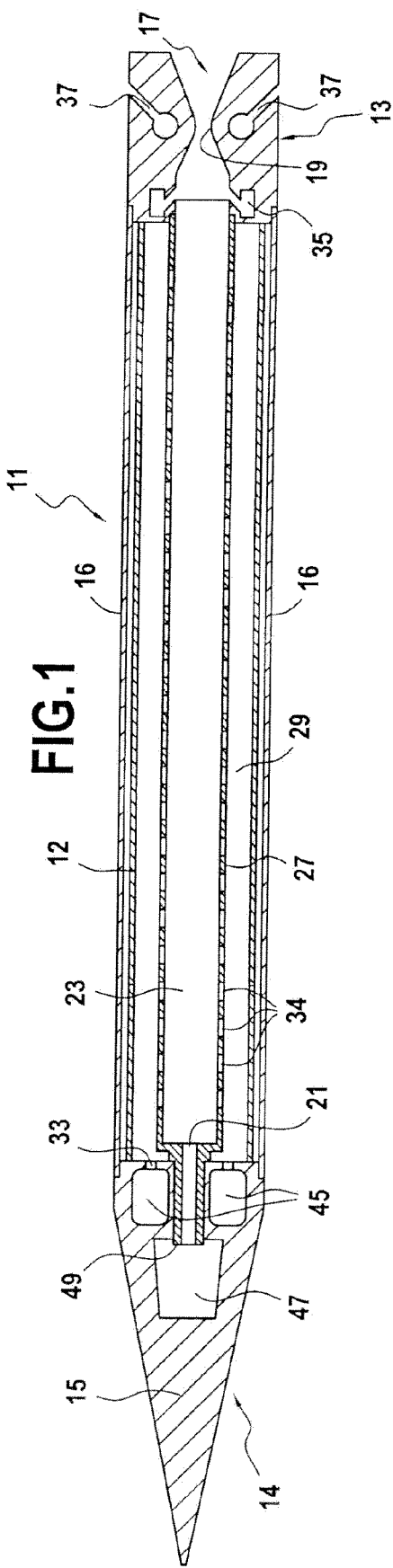
FIG. 1 is a diagrammatic longitudinal section view of a rocket engine in accordance with the invention.
Figure 2:
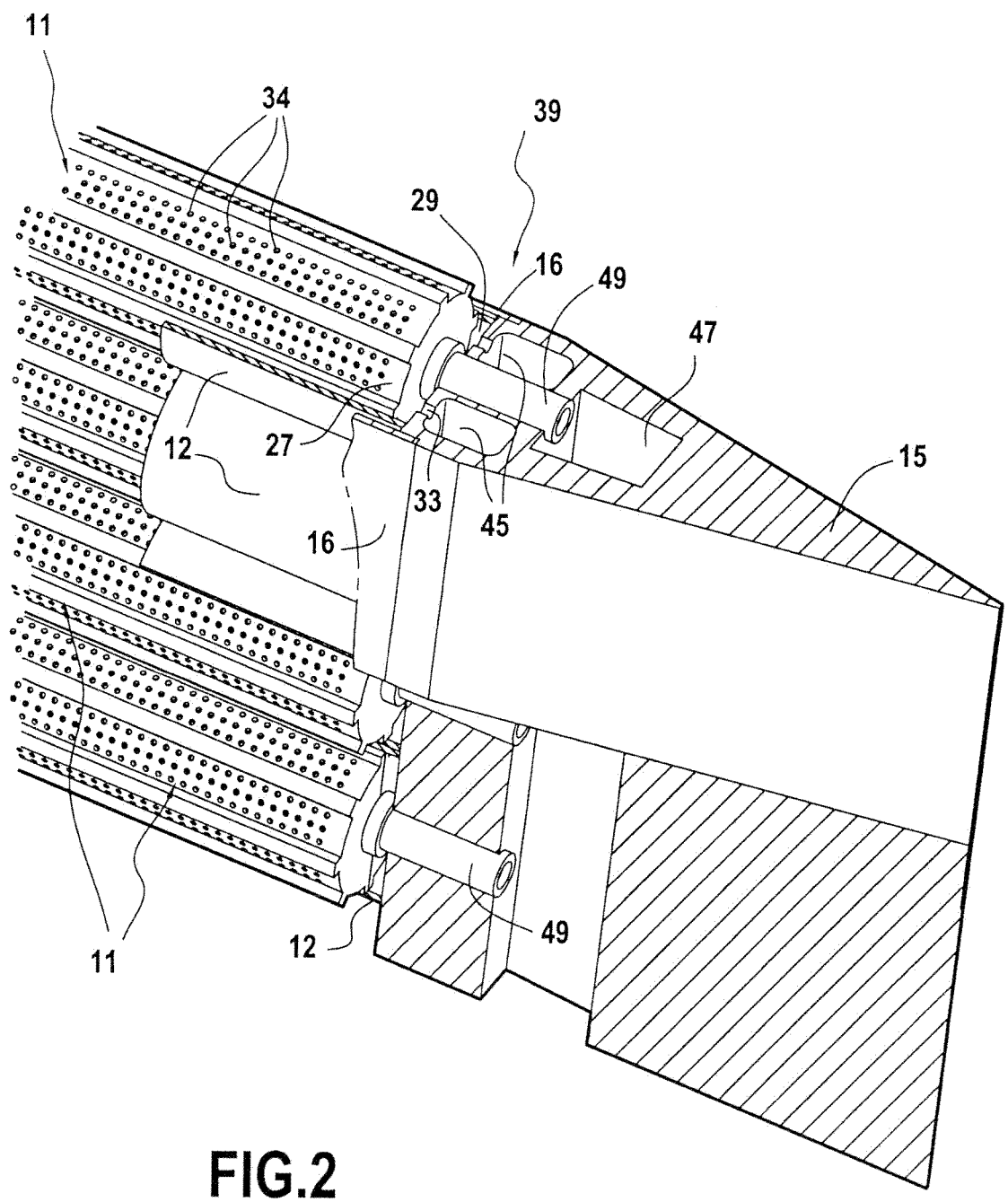
FIG. 2 is a detail view in perspective partially cut away and in section showing the front portion of a rocket-engine pylon.

With reference more particularly to FIGS. 1 and 2, there can be seen a rocket engine 11 suitable for being installed in a ramjet as described below.

The rocket engine 11 comprises a generally cylindrical body 12 having a nose 15 that tapers forwards and an exhaust nozzle 17 including a throat 19 forming a flow restriction in order to increase the speed with which gas is ejected. An oxidizer injector 21 is located axially at the front and opens out into a combustion chamber 23, here generally cylindrical in shape, that extends between the injector orifice 21 (at the front) and the nozzle 17 (at the rear). The wall 27 of the combustion chamber 23 is coaxial with the wall of the body 12. Between them these two walls define a cylindrical annular space 29.

In the example described, the rocket engine 11 forms part of a pylon 39 associating a plurality of similar rocket engines that are disposed side by side longitudinally. Such a pylon comprises a front block 14 that forms the tapering nose 15 for all of the rocket engines, and a rear block 13 having all of the exhaust nozzles 17 incorporated therein. Two side plates 16 interconnect the front block 14 and the rear block 13. They ensure that the pylon 39 is completely faired and they protect the bodies 12 of all the rocket engines.

The structure of the pylon is described in greater detail below.

According to an important characteristic of the invention, the wall 27 of the combustion chamber is arranged as a screen and the space 29 between the two walls constitutes an annular fuel-injection zone that thus extends over the major fraction of length of the body. A fuel injector 33 is situated at the front. It communicates with the space 29. The term "screen" is used herein to mean any wall that allows fuel or a fuel-rich gas to pass through a multitude of perforations that are distributed over its entire area. Such a screen may be constituted by a porous material or by a cylinder perforated with small-diameter holes 34, as shown. This arrangement cools the wall by "sweating" with a protective film of fuel being formed all along the inside face of the screen, enabling the wall 27 to remain intact in spite of the high temperature that exists inside the combustion chamber 23.

The distribution of the holes may vary along the combustion chamber so as to obtain a film that is sufficient, including for protecting the throat 19.

Advantageously, additional injector means 35 are provided for injecting fuel or fuel-rich gas. These means open out into the combustion chamber immediately ahead of the throat 19 so as to reinforce the effectiveness of the protective film flowing along the wall of the throat. The fuel-rich gas may come from the same source as feeds the combustion chamber or it may be colder, by adding an additional quantity of fuel.

Furthermore, channels 37 for passing and injecting fuel are embedded in the space available around the throat 19. The purpose of these channels and the manner in which they are provided are described below.

Such a rocket engine may operate for example by reacting to propellant components such as for example a gas rich in hydrogen for the fuel passing through the screen and liquid oxygen for the oxidizer.

Figure 3:
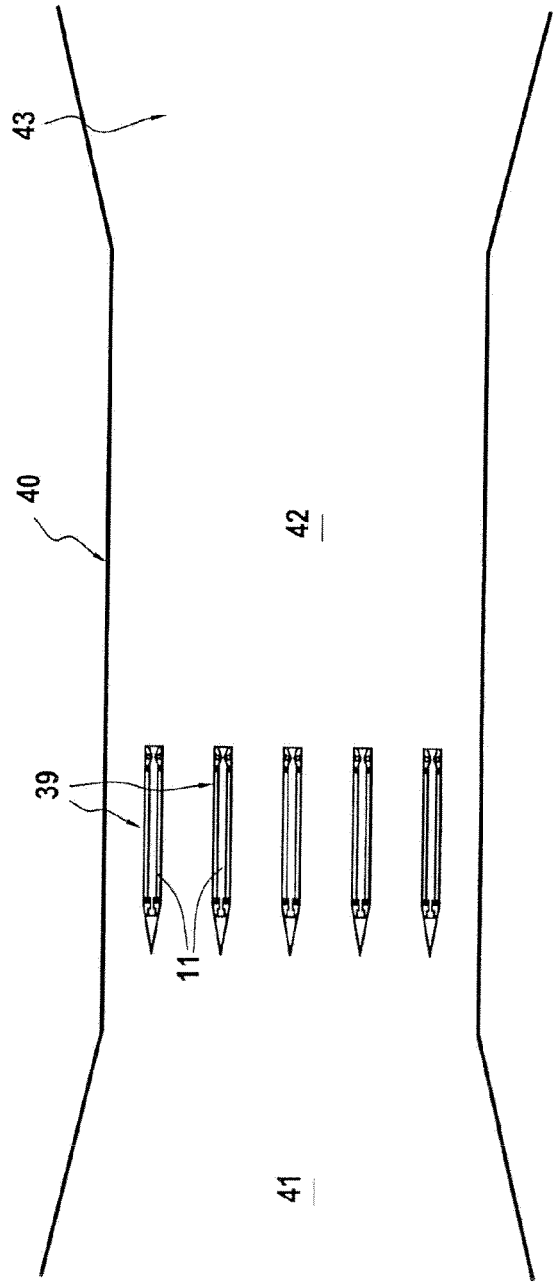
FIG. 3 is a diagrammatic view of a supersonic jet in accordance with the invention.

As shown in FIGS. 2 and 3, because of its small diameter, the structure of such a rocket engine is advantageous for making narrow pylons 39 and thus obtaining a tight grid of pylons that provide little obstruction for the airstream inside a ramjet 40, upstream from the mixing and combustion chamber 42 thereof.

As shown in FIG. 3, a plurality of rocket engines as described above are installed inside the ramjet 40. The ramjet comprises an air inlet 41, the combustion chamber 42 that receives the fuel of the ramjet, and an outlet nozzle 43. The injector means for injecting fuel into the ramjet are not shown. The air inlet leads to the combustion chamber. The rocket engines 11 are installed in the airstream upstream from the combustion chamber 42. They are disposed parallel to the gas flow direction.

As shown, they are arranged side by side in pylons, each pylon 39 extending transversely through the airstream. The tapering nose 15 is common to all of the rocket engines in a given pylon. It is generally in the form of a forwardly-streamlined blade and it contains a fuel feed channel 45 and an oxidizer feed channel 47. The fuel feed channel 45 communicates with all of the annular spaces 29, while the oxidizer feed channel communicates with all of the combustion chambers 23 via parallel ducts 49 opening out axially into the front ends of respective combustion chambers 23.

A plurality of pylons 39 may thus be placed parallel to one another in the airstream (or in a ring for an annular airstream), being spaced apart by a distance that is sufficient to form a grid that presents relatively little obstruction to the airstream.

In operation, the film of fuel or fuel-rich gas that cools by sweating is burnt in post-combustion in the ramjet.

Similarly, the channels 37 deliver fuel to the combustion chamber 42 of the ramjet. They are not used while the rocket engines are in operation, but during the stage of supersonic operation. The efficiency of combustion is improved because of the small spacing between the pylons.

What is claimed is:

1. A supersonic vehicle, comprising a ramjet comprising an air-fuel ramjet combustion chamber and a plurality of rocket engines arranged in an air stream upstream from the air-fuel ramjet combustion chamber, wherein each of the plurality of rocket engines has a rocket combustion chamber different from the air-fuel ramjet combustion chamber, and wherein each rocket combustion chamber is fed with a mixture of propellant components that react within each respective rocket combustion chamber, wherein at least one rocket engine of the plurality of rocket engines comprises a tubular body that is provided internally with a coaxial screen that defines an annular radially inward fuel injection zone injecting fuel into the rocket combustion chamber of the at least one rocket engine, the coaxial screen extending over a major fraction of a length of said tubular body, and an oxidizer injector opening axially inside an upstream end of said coaxial screen;

wherein a downstream end of the rocket combustion chamber of the at least one rocket engine is provided with an exhaust nozzle that has a throat, and wherein an additional fuel injector is arranged proximate a converging section of the exhaust nozzle upstream of the throat that injects fuel into the converging section creating a protecting film at a wall of the throat; and a fuel injection channel arranged proximate the throat in a radially outer wall of the at least one rocket engine that injects fuel directly into the air stream upstream from the air-fuel ramjet combustion chamber of the ramjet.

2. A supersonic vehicle according to claim 1, wherein each rocket engine of the plurality of rocket engines is disposed side by side in pylons, said pylons being spaced apart from one another in the air stream.

3. A supersonic vehicle according to claim 1, wherein, for the at least one rocket engine, said screen comprises a perforated cylindrical wall.

4. A supersonic vehicle according to claim 1, wherein, for the at least one rocket engine, said screen comprises a porous wall.

5. A supersonic vehicle according to claim 1, wherein the mixture of propellant components comprises a gas rich in hydrogen as a fuel and oxygen as an oxidizer.

6. A supersonic vehicle according to claim 2, wherein, for the at least one rocket engine, said screen comprises a perforated cylindrical wall.

7. A supersonic vehicle according to claim 2, wherein, for the at least one rocket engine, said screen comprises a porous wall.

8. A supersonic vehicle according to claim 1, wherein, for the at least one rocket engine, the fuel injection channel is installed in space available around said throat.

9. A supersonic vehicle according to claim 2, wherein, for the at least one rocket engine, the fuel injection channel is installed in space available around said throat.

10. A ramjet comprising: an air-fuel ramjet combustion chamber; and a plurality of rocket engines, the plurality of rocket engines arranged in an air stream upstream from the air-fuel ramjet combustion chamber, wherein each of the plurality of rocket engines has a rocket combustion chamber different from the air-fuel ramjet combustion chamber, and wherein each rocket combustion chamber is fed with a mixture of propellant components that react within each respective rocket combustion chamber, wherein at least one rocket engine of the plurality of rocket engines comprises:

a tubular body that is provided internally with a coaxial screen that defines an annular radially inward fuel injection zone injecting fuel into the rocket combustion chamber of the at least one rocket engine, the coaxial screen extending over a major fraction of a length of the tubular body, and an oxidizer injector opening axially inside an upstream end of the coaxial screen;

an exhaust nozzle that has a throat, provided at a downstream end of the rocket combustion chamber of the at least one rocket engine;

an additional fuel injector arranged proximate a converging section of the exhaust nozzle upstream of the throat that injects fuel into the converging section creating a protecting film at a wall of the throat; and a fuel injection channel arranged proximate the throat in a radially outer wall of the at least one rocket engine that injects fuel directly into the air stream upstream from the air-fuel ramjet combustion chamber of the ramjet.

11. A ramjet according to claim 10, wherein, for the at least one rocket engine, the screen comprises one of: a perforated cylindrical wall and a porous wall.

12. A ramjet according to claim 10, wherein the plurality of rocket engines are disposed side by side in pylons, said pylons being spaced apart from one another in the air stream.

13. A ramjet according to claim 10, wherein the mixture of propellant components comprises a gas rich in hydrogen as a fuel and oxygen as an oxidizer.

14. A ramjet according to claim 10, wherein the fuel injection channel injects fuel into the air stream axially outward at a downstream angle.

* * * * *